(12) United States Patent
Abe

(10) Patent No.: US 11,522,471 B2
(45) Date of Patent: Dec. 6, 2022

(54) VIBRATION TYPE MOTOR AND DRIVER APPARATUS

(71) Applicant: CANON KABUSHIKI KAISHA, Tokyo (JP)

(72) Inventor: Ryo Abe, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 323 days.

(21) Appl. No.: 16/985,023

(22) Filed: Aug. 4, 2020

(65) Prior Publication Data

US 2021/0058008 A1 Feb. 25, 2021

(30) Foreign Application Priority Data

Aug. 19, 2019 (JP) .............................. JP2019-149801

(51) Int. Cl.
*H02N 2/02* (2006.01)
*G02B 7/04* (2021.01)
*B06B 1/06* (2006.01)
*H02N 2/00* (2006.01)

(52) U.S. Cl.
CPC ........... *H02N 2/026* (2013.01); *B06B 1/0644* (2013.01); *G02B 7/04* (2013.01); *H02N 2/0055* (2013.01)

(58) Field of Classification Search
CPC ........ H02N 2/026; H02N 2/0055; H02N 2/04; G02B 7/04; G02B 7/09; G02B 7/282; G03B 13/36; B06B 1/0644
See application file for complete search history.

(56) References Cited

U.S. PATENT DOCUMENTS

2015/0125140 A1\* 5/2015 Ashizawa .............. H02N 2/163
396/125

FOREIGN PATENT DOCUMENTS

JP 2018-067983 A 4/2018

\* cited by examiner

*Primary Examiner* — Emily P Pham
(74) *Attorney, Agent, or Firm* — Canon U.S.A., Inc. I.P. Division

(57) ABSTRACT

A vibration type motor has a vibrator; a frictional member, a pressurization unit that causes the vibrator and the frictional member to come into pressure-contact with each other, a retaining member that retains the frictional member, and a fixing unit that fixes the friction member to the retaining member, and the vibrator and the frictional member make relative movement by the vibrator being vibrated. The frictional member has a first area including an area that contacts the vibrator and a second area including an area that is retained by the retaining member. A size of the first area in an orthogonal direction that is orthogonal to both the direction of the relative movement and a pressure direction of the pressurization unit is smaller than a size of the second area in the orthogonal direction.

13 Claims, 6 Drawing Sheets

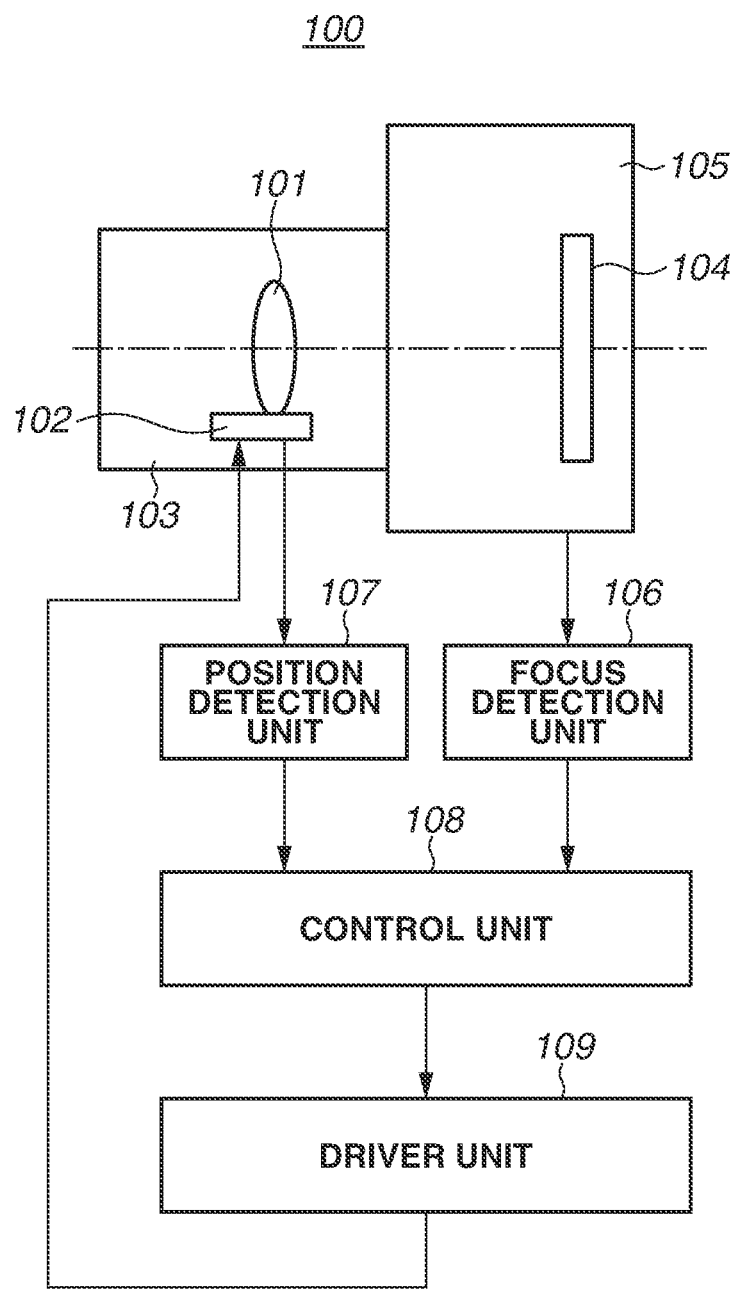

VIBRATION TYPE MOTOR AND DRIVER APPARATUS

BACKGROUND

Field of the Disclosure

The present disclosure relates to a vibration type motor that vibrates a vibrator to acquire a thrust force, and a driver apparatus using the vibration type motor.

Description of the Related Art

A digital camera includes a lens driver apparatus that moves all or a part of an optical system based on defocus of an image formed on an image plane via an optical system in order to correct the defocus of the image, thus achieving a focus. In recent years, a lens driver apparatus with an ultrasonic motor as a drive source has been receiving attention for speed enhancement, accuracy enhancement, and noise reduction of focus operation. In particular, a linear type ultrasonic motor capable of driving a driven member in a straight direction, has good controllability and good drive characteristics, and is used as a drive source of a lens driver apparatus.

One of the issues of the ultrasonic motor is the generation of vibration and unusual sound. The ultrasonic motor vibrates a vibrator in pressure-contact with a frictional member at a high frequency to acquire a thrust force. If a resonance frequency that is determined based on a shape of the frictional member is close to a drive frequency, vibration of the frictional member is excited, and audible unusual sound is generated.

Japanese Patent Laid-Open No. 2018-67983 discusses a downsized linear-type ultrasonic motor and a driver apparatus including the ultrasonic motor, in which a resonance frequency of the frictional member is adjusted by a shape of a frictional member being changed.

In the configuration discussed in Japanese Patent Laid-Open No. 2018-67983, although the resonance frequency is avoided through adjustment of the resonance frequency of the frictional member, vibration is not reduced or prevented. Thus, if the shape of the frictional member is restricted, it may become difficult to avoid resonance of the frictional member. Moreover, if a stroke of the motor is longer, the frictional member may vibrate more easily. Consequently, a degree of difficulty in designing resonance avoidance can be higher.

SUMMARY

The present disclosure has been made in consideration of the aforementioned effects, and to realize a vibration type motor capable of reducing or preventing the generation of unusual sound even if the motor has a long stroke and a driver apparatus using the vibration type motor.

The present disclosure provides a vibration type motor comprising: a vibrator; a frictional member; a pressurization unit that causes the vibrator and the frictional member to come into pressure-contact with each other; a retaining member that retains the frictional member; and a fixing unit that fixes the friction member to the retaining member, wherein the vibrator and the frictional member make relative movement by the vibrator being vibrated, wherein the frictional member has a first area including an area that contacts the vibrator and a second area including an area that is retained by the retaining member, the second area is arranged at both ends of the frictional member in a direction of the relative movement, and the first area is arranged between the second areas, a position at which the frictional member is fixed by the fixing unit is aligned with the first area in the direction of the relative movement, and a size of the first area in an orthogonal direction that is orthogonal to both the direction of the relative movement and a pressure direction of the pressurization unit is smaller than a size of the second area in the orthogonal direction.

According to the present disclosure, a vibration type motor capable of reducing or preventing the generation of unusual sound and a driver apparatus using the vibration type motor can be realized even if the motor has a long stroke.

Further features of the present disclosure will become apparent from the following description of exemplary embodiments with reference to the attached drawings.

BRIEF DESCRIPTION OF THE DRAWINGS

FIG. 1 is a block diagram illustrating an image capture apparatus 100 according to the present embodiment.

DESCRIPTION OF THE EMBODIMENTS

Figure 2A:
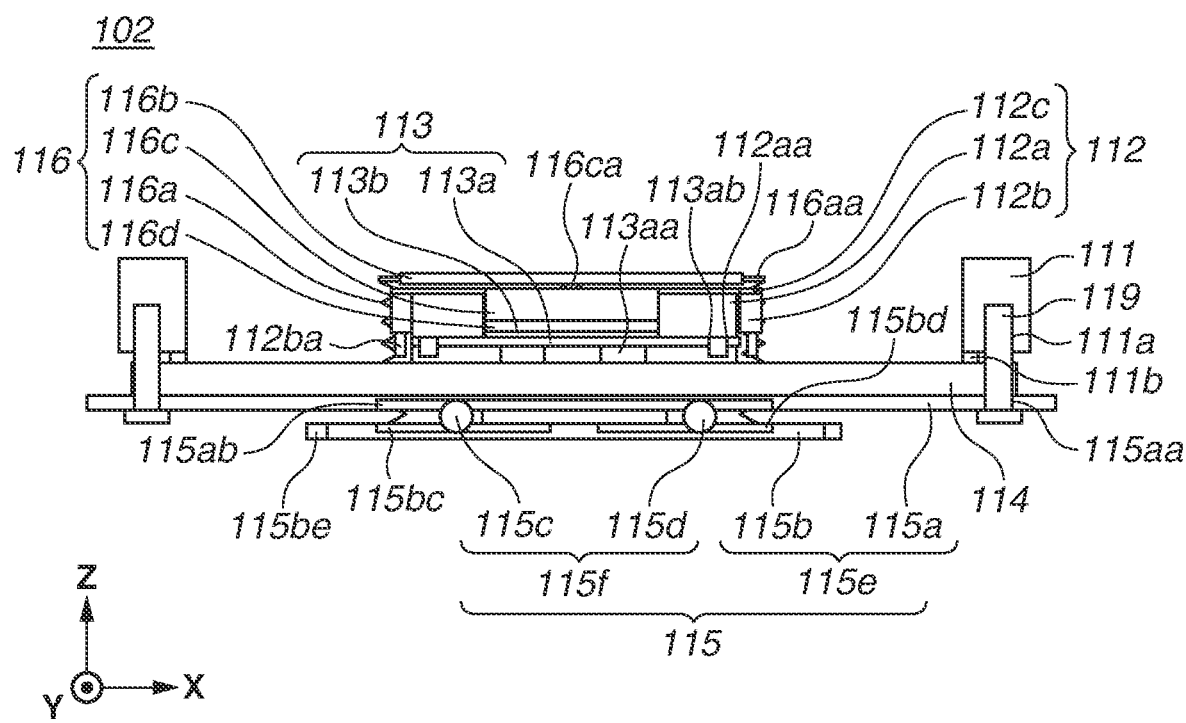
FIGS. 2A and 2B are sectional views each illustrating an ultrasonic motor 102 according to the present embodiment.

Hereinafter, embodiments will be described in detail with reference to the accompanying drawings. The following embodiments are not intended to limit the scope of the claims of the present disclosure. Although a plurality of features is described in the following embodiments, all of the features may not necessarily be required for the present disclosure, and the plurality of features may be optionally combined. In the accompanying drawings, similar configurations or the same configurations are given the same reference numerals, and descriptions thereof are omitted.

A description will be provided of an image capture apparatus 100 to which a driver apparatus according to the present embodiment is applied.

FIG. 1 is a block diagram of the image capture apparatus 100. The image capture apparatus 100 includes a lens barrel 103 including a lens 101 and an ultrasonic motor 102 configured to drive the lens 101, and a camera body 105 including an imaging element 104. The lens 101 and the ultrasonic motor 102 each are a part of an imaging optical system. A focus state of an image which is formed on the imaging element 104 is detected using a known method, such as a phase difference detection method and a contrast method, by a focus detection unit 106, and a focus detection signal of the detected focus state is input to a control unit 108 including a central processing unit (CPU). Moreover, a current position of the lens 101 is detected by a position detection unit 107 using a hall effect sensor or a photointerrupter, and a position detection signal of the detected current position is input to the control unit 108. The control unit 108 outputs a control signal to a driver unit 109 based on the focus detection signal and the position detection signal, and drives the ultrasonic motor 102. The driver unit 109 includes a lens-side CPU disposed in the lens barrel 103. This configuration enables the image capture apparatus 100 to drive the lens 101 to a target position by using the ultrasonic motor 102 to correct defocus. Thus, the image capture apparatus 100 can capture a good image. The image capture apparatus 100 may include other components.

Figure 2B:
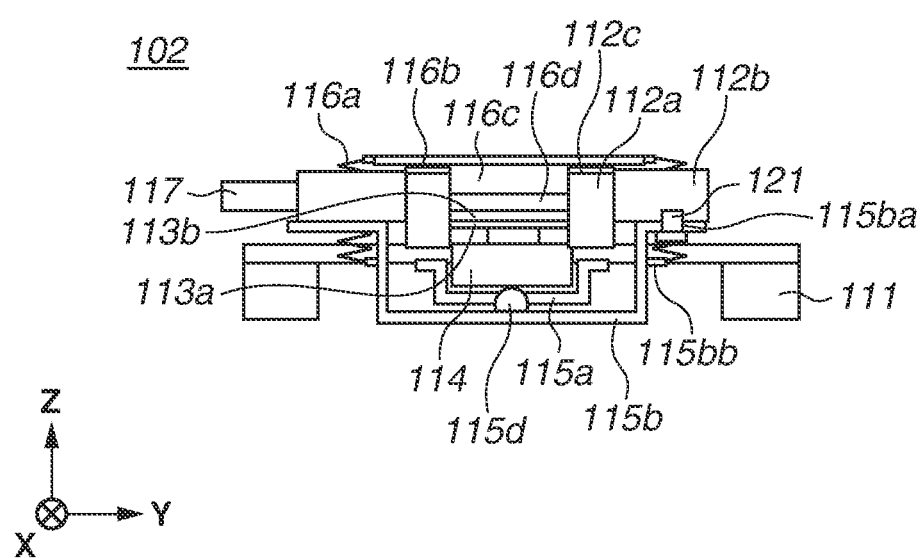
Figure 3:
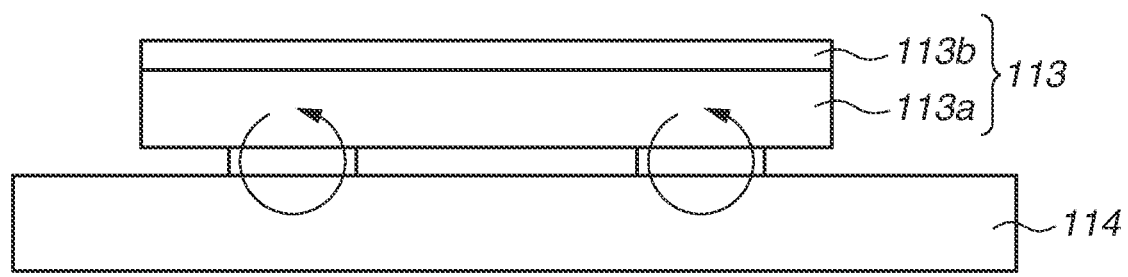
FIG. 3 is a diagram illustrating operation of a vibrator 113 included in the ultrasonic motor 102 according to the present embodiment.

Next, a configuration of the ultrasonic motor 102, which is a vibration type motor, according to the present embodiment will be described with reference to FIGS. 2A, 2B, and 3. Each of FIGS. 2A and 2B is a sectional view illustrating the structure of the ultrasonic motor 102. FIG. 2A is a sectional view as seen from a direction Y orthogonal to both of a travel direction X of the ultrasonic motor 102 and a pressure direction Z. FIG. 2B is a sectional view as seen from the travel direction X of the ultrasonic motor 102. FIG. 3 is a diagram illustrating an operation of a vibrator 113.

The ultrasonic motor 102 includes the vibrator 113, a frictional member 114, a first retaining member 111 that retains the frictional member 114, a second retaining member 112 that retains the vibrator 113, a guide unit 115, a pressurization unit 116, and a connection unit 117.

The first retaining member 111 retains the frictional member 114 and a first guide member 115a. The first retaining member 111 has a substantially plate shape, and is fixed to the lens barrel 103 (FIG. 1). The first retaining member 111 has a fastening hole 111a, and is fastened with a frictional member fixing unit 119, such as a screw, such that the frictional member 114 is retained. Moreover, the first retaining member 111 includes a contact portion 111b that contacts the frictional member 114. The first retaining member 111 further has a fastening hole 111c (FIG. 5), and is fastened with a reinforcement member fixing unit 120 (FIG. 5) such that the first guide member 115a is retained.

The second retaining member 112 includes a first vibrator-retaining member 112a, a second vibrator-retaining member 112b, and a thin plate 112c. The first vibrator-retaining member 112a has a protrusion 112aa. The protrusion 112aa is engaged in an engagement hole portion 113ab of the vibrator 113, so that the second retaining member 112 retains the vibrator 113. The second vibrator-retaining member 112b retains a second guide member 115b and the connection unit 117. The thin plate 112c is an elastic member having lower rigidity in the pressure direction Z of the pressurization unit 116 than that in the travel direction X and the direction Y, and connects the first vibrator-retaining member 112a to the second vibrator-retaining member 112b. With such a vibrator retaining structure, a displacement between the vibrator 113 and the frictional member 114 in the pressure direction Z is absorbed by deformation of the thin plate 112c, so that the vibrator 113 and the frictional member 114 can remain in a stable contact state, thus generating a thrust force with high efficiency.

The vibrator 113 includes a vibrating plate 113a and a piezoelectric element 113b adhesively fixed to the vibrating plate 113a. As illustrated in FIG. 3, the vibrating plate 113a has two protrusions 113aa on a backside of a rectangular flat plate portion to which the piezoelectric element 113b is adhesively fixed such that the two protrusions 113aa are aligned in a longitudinal direction. Moreover, in the vibrating plate 113a, an engagement hole portion 113ab for fixation to the first vibrator-retaining member 112a is formed so as to extend from the flat plate portion to the front and the rear in the travel direction X. The piezoelectric element 113b is electrically connected to a flexible substrate (not illustrated). If a voltage having a specific amplitude and a phase difference is applied from the flexible substrate to the piezoelectric element 113b, the vibrator 113 is deformed and a tip of the protrusion 113aa makes an elliptical motion.

The frictional member 114 contacts the vibrator 113, and is fastened by the frictional member fixing unit 119 to the first retaining member 111. If a voltage is applied to the vibrator 113 and the protrusion 113aa makes an elliptical motion, a friction force is intermittently generated between the vibrator 113 and the frictional member 114, and the generated friction force acts as a thrust force toward a relative movement direction (the travel direction) X in which the vibrator 113 makes a relative movement with respect to the frictional member 114. Such a thrust force relatively moves the second retaining member 112 with respect to the first retaining member 111.

The guide unit 115 guides the relative movement of the vibrator 113 with respect to the frictional member 114, and includes a guide member 115e and a rolling member 115f. The guide member 115e includes the first guide member 115a and the second guide member 115b, and the rolling member 115f includes a first rolling member 115c and a second rolling member 115d. The first guide member 115a has a fastening hole 115aa, and is fastened with the reinforcement member fixing unit 120 to the first retaining member 111. Thus, the first guide member 115a is retained by the first retaining member 111, and does not make a relative movement with respect to the frictional member 114. The first guide member 115a further has a V-groove 115ab, and contacts the first rolling member 115c and the second rolling member 115d. The second guide member 115b has a fastening hole 115ba, and is fastened with a fixing unit 121, such as a screw, to the second vibrator-retaining member 112b. Thus, the second guide member 115b is retained by the second retaining member 112, and relatively moves with the vibrator 113. The second guide member 115b further has an engaging portion 115bb that engages the pressurization unit 116, and is urged in the pressure direction Z of the pressurization unit 116. The second guide member 115b yet further has V-grooves 115bc and 115bd that respectively contact the first rolling member 115c and the second rolling member 115d. The first rolling member 115c is clamped by the V-groove 115ab of the first guide member 115a and the V-groove 115bc of the second guide member 115b, while the second rolling member 115d is clamped by the V-groove 115ab of the first guide member 115a and the V-groove 115bd of the second guide member 115b. With such a configuration, positions of the first rolling member 115c and the second rolling member 115d are regulated by the first guide member 115a in such a manner that the first rolling member 115c and the second rolling member 115d is movable only in the travel direction X. Similarly, a position of the second guide member 115b is regulated in such a manner that the second guide member 115b is movable only in the travel direction X. Furthermore, the rolling of the rolling member 115f enables the guide member 115e to relatively move with low friction. According to such a configuration, since the second guide member 115b is guided in the travel direction X with respect to the first guide member 115a, the second retaining member 112 is guided toward the travel direction X with respect to the first retaining member 111. The above described configuration is one example of a configuration in which the vibrator 113 moves. Alternatively, the frictional member 114 may move. Moreover, the above described configuration is one example of a configuration in which the vibrator 113 and the frictional member 114 remain in a stable contact state. Another configuration may be employed. For example, the first vibrator-retaining member 112a and the second vibrator-retaining member 112b may be connected via a rolling member.

The pressurization unit 116 includes an elastic member 116a, a first transmission member 116b, a second transmission member 116c, and a third transmission member 116d. The pressurization unit 116 is a pressurization mechanism that generates a pressure force by which the vibrator 113 and the frictional member 114 are brought into pressure-contact. The elastic member 116a is a tensile spring. In the present embodiment, four elastic members 116a are arranged in positions surrounding the vibrator 113. The number of the elastic members 116a is not limited to four. One end of the elastic member 116a is hooked on a retaining portion 116aa of the first transmission member 116b, and the other end is hooked on the engaging portion 115bb of the second guide member 115b. Thus, the first transmission member 116b and the second guide member 115b are pressed so as to approach each other. The first transmission member 116b has the retaining portion 116aa which retains the elastic member 116a, and transmits a pressure force to the second transmission member 116c. The second transmission member 116c has a circular contact portion 116ca in contact with the first transmission member 116b, and transmits the pressure force transmitted from the first transmission member 116b to the third transmission member 116d. The contact between the contact portion 116ca and the first transmission member 116b enables a pressure force to be efficiently transmitted even in a case where the first transmission member 116b and the second transmission member 116c are inclined due to manufacturing variation. The third transmission member 116d is an elastic member made of a material that easily absorbs vibration, such as felt. The third transmission member 116d is disposed so as to be sandwiched between the vibrator 113 and the second transmission member 116c to reduce the transmission of vibration of the vibrator 113 to other members. In the direction Z, the first transmission member 116b, the second transmission member 116c, the third transmission member 116d, the vibrator 113, the frictional member 114, the first guide member 115a, the first rolling member 115c, the second rolling member 115d, and the second guide member 115b are stacked. Such a configuration enables a pressure force of the elastic member 116a to be efficiently transmitted to the vibrator 113 via each transmission member, thus causing the vibrator 113 and the frictional member 114 to come into pressure-contact with each other. The above-described configuration is one example of a configuration in which the vibrator 113 and the frictional member 114 are brought into pressure-contact with each other, and a position of the elastic member and the number of the transmission members are not limited thereto.

The connection unit 117 is a member fixed to the second vibrator-retaining member 112b and used to transmit a thrust force generated by the relative movement of the vibrator 113 and the frictional member 114 to a lens retaining member 118 (described below). The connection unit 117 can be integrally formed with the second vibrator-retaining member 112b.

The frictional member fixing unit 119 is a member with which the frictional member 114 is fastened to the first retaining member 111, such as a screw.

The above described configuration enables the ultrasonic motor 102 to generate a thrust force between the vibrator 113 and the frictional member 114 with an applied voltage, so that the second retaining member 112, which retains the vibrator 113, makes a relative movement with respect to the first retaining member 111. Then, the generated thrust force is transmitted to the lens retaining member 118 which is a driven member via the connection unit 117, so that the lens retaining member 118 is moved in an optical axis direction (the travel direction X).

Figure 4A:
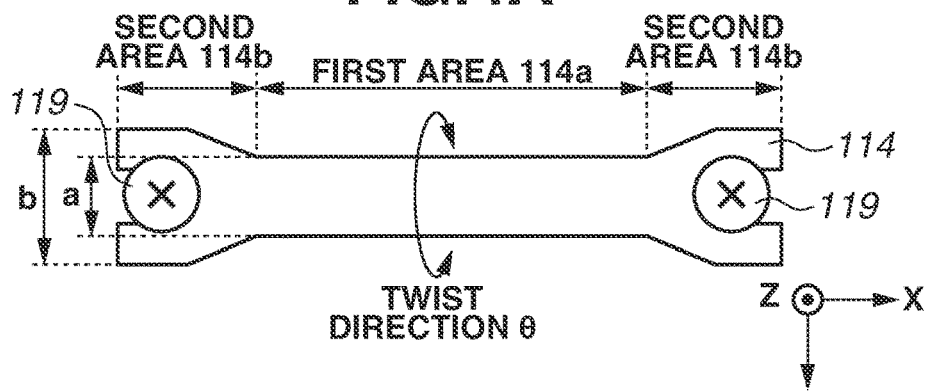
FIGS. 4A to 4E are diagrams each illustrating a shape and a retaining structure of a frictional member 114 included in the ultrasonic motor 102 according to the present embodiment.
Figure 4B:
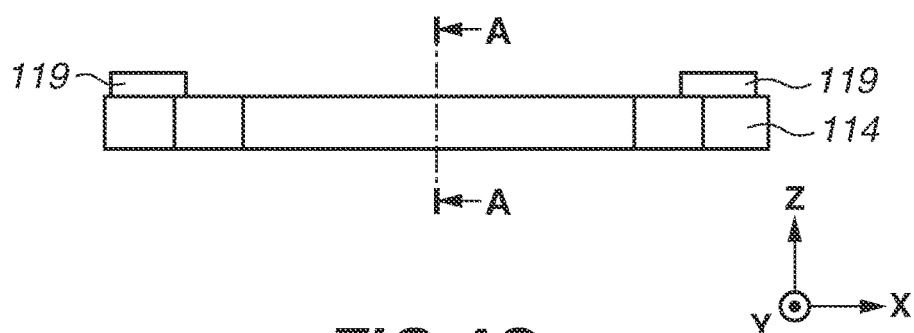
Figure 4C:
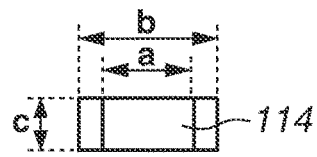
Figure 4D:
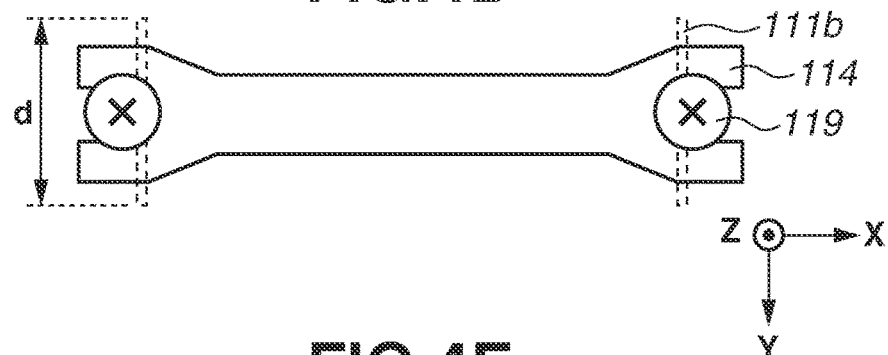
Figure 4E:
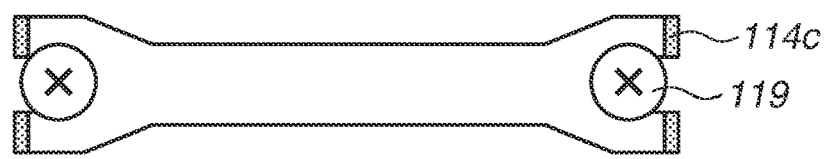

Next, a shape and the retaining structure of the frictional member 114 will be described with reference to FIGS. 4A to 4E. Each of FIGS. 4A to 4E is a diagram illustrating the shape of the frictional member 114. FIG. 4A is a diagram as seen from the direction Z. FIG. 4B is a diagram as seen from the direction Y. FIG. 4C is a sectional view taken along the line A-A of the frictional member 114 illustrated in FIG. 4B. FIG. 4D is an enlarged view illustrating one portion of the first retaining member 111 and the frictional member 114 as seen from the direction Z. FIG. 4E is a diagram illustrating a shape of the frictional member 114 for resonance frequency adjustment, as seen from the direction Z.

As illustrated in FIG. 4A, the frictional member 114 includes a first area 114a including an area in contact with the vibrator 113, and second areas 114b each including an area that is fixed to the first retaining member 111 by the frictional member fixing unit 119. The second area 114b is arranged at both ends in the travel direction X, and the first area 114a is arranged between the second areas 114b. Moreover, the first area 114a is arranged to overlap the frictional member fixing unit 119 as seen from the travel direction X. That is, a position at which the frictional member 114 is fixed by the frictional member fixing unit 119 is aligned with the first area 114a in the travel direction X.

Herein, a size in the travel direction X of the vibrator 113 with respect to the frictional member 114 is defined as a length, a size in the pressure direction Z of the pressurization unit 116 is defined as a thickness, and a size in the direction Y orthogonal to both of the travel direction X and the pressure direction Z is defined as a width for the sake of description. Herein, a width a of the first area 114a is smaller than a width b of the second area 114b. Moreover, a thickness c of the frictional member 114 has a size relation in which the thickness c of the frictional member 114 is closer to the width a of the first area 114a than the width b of the second area 114b. Since there is such a size relation in which the width of the first area 114a is close to the thickness of the frictional member 114, a cross section of the first area 114a is shaped similar to a square. With such a shape, the frictional member 114 has high rigidity in a twist direction θ about an axis parallel to the relative movement direction X. In addition, the width b of the second area 114b is greater than the width a of the first area 114a, so that a width of the frictional member 114 to be fixed by the frictional member fixing unit 119 is increased, and the frictional member 114 has high rigidity in every direction including the twist direction θ. As long as a width of the first area 114a is closer to a thickness of the frictional member 114 than a width of the second area 114b, a configuration with high rigidity in the twist direction θ can be provided. In such a case, a width of the first area 114a may not necessarily be equal to a thickness of the frictional member 114.

In addition, as illustrated in FIG. 4D, the frictional member 114 is retained in contact with the contact portion 111b of the first retaining member 111. The contact portion 111b contacts the frictional member 114 in the thickness direction Z of the frictional member 114, and serves as a contacting surface with good positional accuracy. Herein, a width d of the contact portion 111b is greater than the width b of the second area 114b. Moreover, in the travel direction X, the contact portion 111b is arranged at a position between the first area 114a and the frictional member fixing unit 119. With the shape and the contact position of the contact portion 111b, the frictional member 114 has higher rigidity in the twist direction θ about the axis parallel to the travel direction X.

The frictional member 114 further has an adjustment portion 114c as illustrated in FIG. 4E. The adjustment portion 114c is included in the second area 114b of the frictional member 114, and is arranged on an end side of the frictional member 114 relative to the frictional member fixing unit 119. The adjustment portion 114c is an area for adjustment of the length of the frictional member 114. Since a change in a length of the adjustment portion 114c changes rigidity of the frictional member 114, the adjustment portion 114c enables the frictional member 114 to be adjusted to have predetermined rigidity. Thus, a change in a length of the adjustment portion 114c in the relative movement direction can change a resonance frequency of the frictional member 114.

With the foregoing configuration, the ultrasonic motor 102 of the present embodiment has a configuration in which the frictional member 114 has rigidity, particularly, high rigidity in a twist direction and the rigidity of the frictional member 114 is adjustable. In the present embodiment, the second area 114b has a changing portion the width of which increases with increased distance from the first area 114a, and the changing portion has a tapered shape with the width thereof continuously changes. Alternatively, the changing portion may have a shape in which the width thereof changes stepwise.

Figure 5:
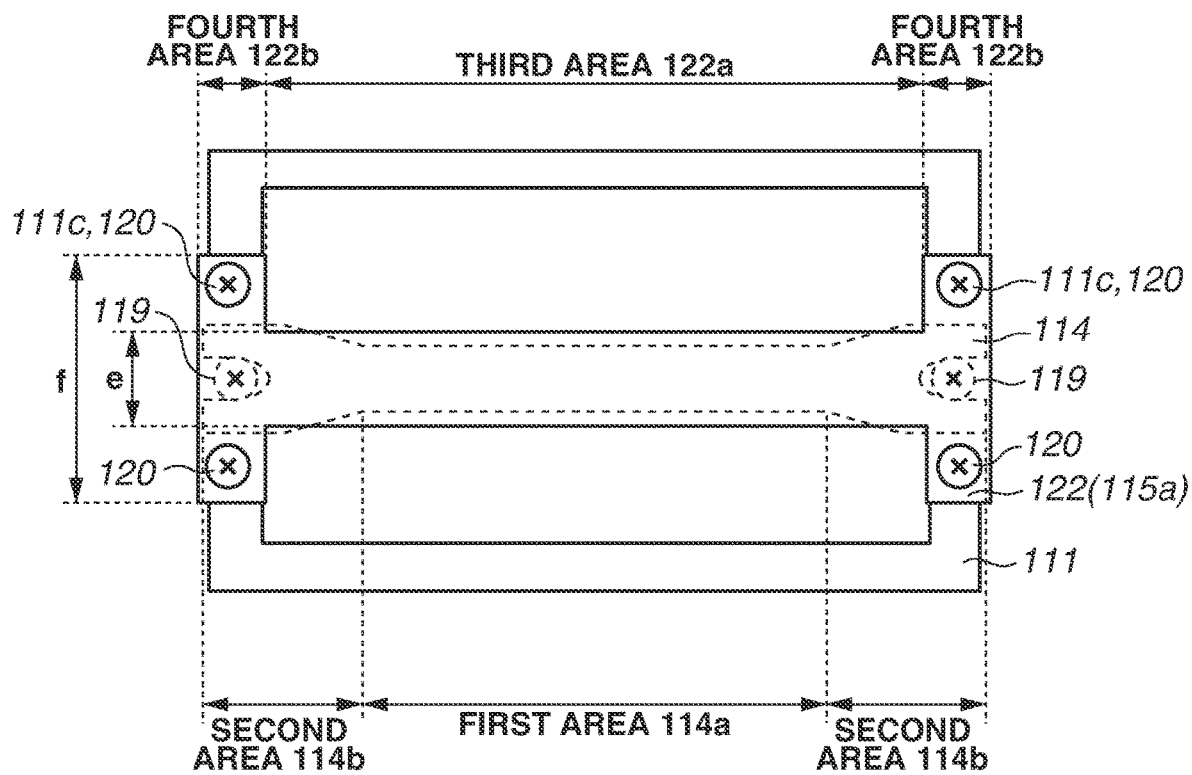
FIG. 5 is a diagram illustrating a shape of a reinforcement member 122 included in the ultrasonic motor 102 according to the present embodiment.

Next, a shape of the reinforcement member 122 for reinforcing the frictional member 114 will be described with reference to FIG. 5, which is a diagram illustrating a relation between the first retaining member 111, the frictional member 114, and the reinforcement member 122. In FIG. 5, shapes of the frictional member 114 and the frictional member fixing unit 119 are indicated by broken lines.

The reinforcement member 122 is the same member as the first guide member 115a in the present embodiment, and is retained with the frictional member 114 by the first retaining member 111. As illustrated in FIG. 5, the reinforcement member 122 has an I-shape elongated in the travel direction X, and includes a third area 122a including an area that contacts the rolling member 115f, and fourth areas 122b each including an area that is fixed to the first retaining member 111 by the reinforcement member fixing unit 120. There are two fourth areas 122b in the travel direction X, and the third area 122a is arranged between the fourth areas 122b. Here, a width e of the third area 122a is smaller than a width f of the fourth area 122b. In the pressure direction Z, the third area 122a of the reinforcement member 122 and the first area 114a of the frictional member 114 at least partially overlap, and the fourth area 122b of the reinforcement member 122 and the second area 114b of the frictional member 114 at least partially overlap. With such a shape, the rigidity of the first retaining member 111 is enhanced by the rigidity of the reinforcement member 122, so that the frictional member 114 which is retained by the first retaining member 111 has higher rigidity in the twist direction θ.

With the foregoing configuration, the ultrasonic motor 102 of the present embodiment has a configuration in which the frictional member 114 has rigidity, particularly, high rigidity in a twist direction. In the present embodiment, the first guide member 115a and the reinforcement member 122 are the same member. Alternatively, the first guide member 115a and the reinforcement member 122 may be separate members.

Figure 6A:
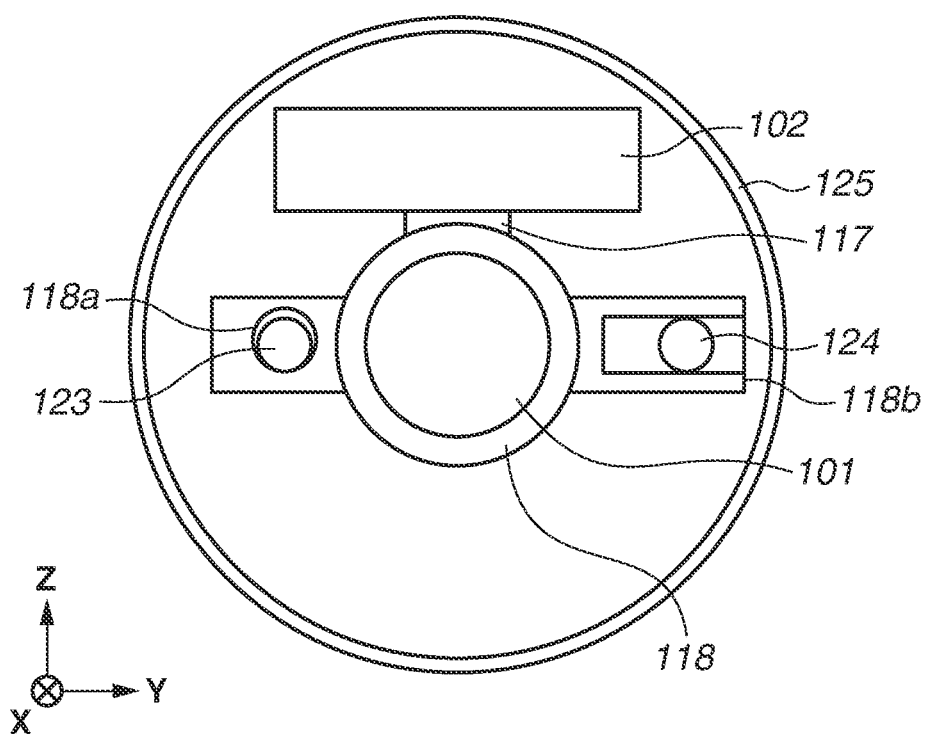
FIGS. 6A and 6B are diagrams each illustrating a configuration of a fixing barrel 125 according to the present embodiment.
Figure 6B:
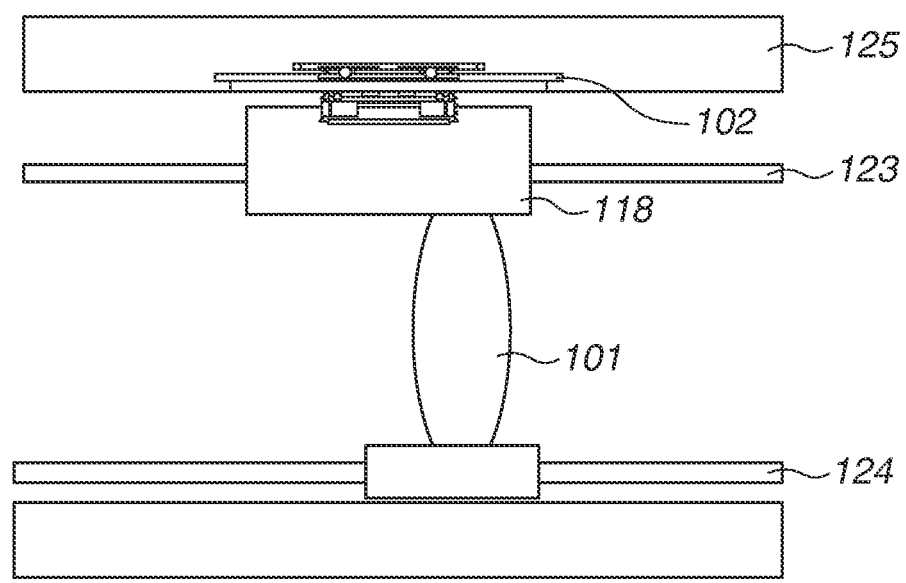

Next, a mechanism for moving the lens retaining member 118 with the ultrasonic motor 102 will be described with reference to FIGS. 6A and 6B. Each of FIGS. 6A and 6B is a diagram illustrating the fixing barrel 125 on which the ultrasonic motor 102 is mounted. FIG. 6A is a sectional view of the fixing barrel 125 as seen from the front. FIG. 6B is a diagram of the fixing barrel 125 as seen from a side surface. In each of FIGS. 6A and 6B, a positional relation of the components is schematically illustrated.

The fixing barrel 125 has a tubular shape, and retains a first lens guide member 123, a second lens guide member 124, and the ultrasonic motor 102 inside the lens barrel 103. The lens retaining member 118 has a tubular shape, and retains the lens 101 for focus adjustment in the center thereof. The lens retaining member 118 has a round hole 118a and a U-groove 118b. In the lens retaining member 118, the round hole 118a is formed such that the first lens guide member 123 penetrates the round hole 118a, and the U-groove 118b is formed such that the second lens guide member 124 contacts the U-groove 118b. Moreover, the lens retaining member 118 is connected to the ultrasonic motor 102 via the connection unit 117.

The first lens guide member 123 is a main guide bar, and contacts the lens retaining member 118 via the round hole 118a. A movement of the lens retaining member 118 in a direction orthogonal to the travel direction X is restricted by the first lens guide member 123.

The second lens guide member 124 is a sub-guide bar, and contacts the lens retaining member 118 via the U-groove 118b. A rotational movement of the lens retaining member 118 around the first lens guide member 123 is restricted by the second lens guide member 124. The first lens guide member 123 and the second lens guide member 124 guide the lens retaining member 118 such that the lens retaining member 118 makes a parallel movement in the travel direction X, and thus the lens retaining member 118 makes a relative movement with respect to the fixing barrel 125.

According to such configurations, a thrust force which is generated by the ultrasonic motor 102 is transmitted to the lens retaining member 118 by the connection unit 117. Since a movement of the lens retaining member 118 in directions other than the travel direction X is restricted by the first lens guide member 123 and the second lens guide member 124, the lens retaining member 118 is integrally driven with the lens 101 in the travel direction X. Thus, the thrust force generated by the vibrator 113 and the frictional member 114 is transmitted to the lens 101 via the connection unit 117 to drive the lens 101, so that a focus adjustment can be made.

In the present embodiment, a shape of a frictional member is devised to increase the rigidity of the frictional member in a twist direction θ, and generation of unusual sound can be prevented even in a motor having a long stroke, as described above. The present embodiment has been described using an image capture apparatus as one example of a driver apparatus using a vibrator type motor to which the present disclosure is applied. However, the present embodiment is applicable to other driver apparatuses, and a driven member as a target to be driven by the vibration type motor is not limited to a lens retaining member. For example, an imaging element in the image capture apparatus may be a driven member, or a stage, such as a microscope, may be a driven member.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2019-149801, filed Aug. 19, 2019 which is hereby incorporated by reference herein in its entirety.

What is claimed is:

1. A vibration type motor comprising:
   a vibrator;
   a frictional member;
   a pressurization unit that causes the vibrator and the frictional member to come into pressure-contact with each other;
   a retaining member that retains the frictional member; and
   a fixing unit that fixes the friction member to the retaining member,
   wherein the vibrator and the frictional member make relative movement by the vibrator being vibrated,
   wherein the frictional member has a first area including an area that contacts the vibrator and a second area including an area that is retained by the retaining member, the second area is arranged at both ends of the frictional member in a direction of the relative movement, and the first area is arranged between the second areas at the ends of the frictional member,
   a position at which the frictional member is fixed by the fixing unit is aligned with the first area in the direction of the relative movement, and
   a size of the first area in an orthogonal direction that is orthogonal to both the direction of the relative movement and a pressure direction of the pressurization unit is smaller than a size of the second area in the orthogonal direction.

2. The vibration type motor according to claim 1, wherein the size of the first area in the orthogonal direction is closer to a size of the first area in the pressure direction of the pressurization unit than the size of the second area in the orthogonal direction.

3. The vibration type motor according to claim 1, wherein the retaining member has a contact portion that contacts the frictional member,
   a size of the contact portion in the orthogonal direction is greater than the size of the second area in the orthogonal direction, and
   the contact portion is disposed at a position closer to the first area than a position of the fixing unit in the direction of the relative movement.

4. The vibration type motor according to claim 1, wherein the frictional member has an adjustment portion for adjustment of a resonance frequency of the frictional member, on an end side of the friction member relative to the position at which the frictional member is fixed by the fixing unit in the direction of the relative movement.

5. The vibration type motor according to claim 1, further comprising a reinforcement member that reinforces the retaining member,
   wherein the reinforcement member has a third area that overlaps the first area in the pressure direction and a fourth area that overlaps the second area in the pressure direction,
   a size of the third area in the orthogonal direction is smaller than a size of the fourth area in the orthogonal direction, and
   the size of the fourth area in the orthogonal direction is greater than the size of the second area in the orthogonal direction.

6. The vibration type motor according to claim 1, wherein the second area has a changing portion in which a size in the orthogonal direction increases with increased distance from the first area in the direction of the relative movement.

7. The vibration type motor according to claim 6, wherein, in the changing portion, the size in the orthogonal direction continuously changes.

8. The vibration type motor according to claim 6, wherein, in the changing portion, the size in the orthogonal direction changes stepwise.

9. A driver apparatus which comprises a vibration type motor and a driven member that is moved by the vibration type motor,
   wherein the vibration type motor comprises:
      a vibrator;
      a frictional member;
      a pressurization unit that causes the vibrator and the frictional member to come into pressure-contact with each other;
      a retaining member that retains the frictional member; and
      a fixing unit that fixes the friction member to the retaining member,
      wherein the vibrator and the frictional member make relative movement by the vibration type motor vibrating the vibrator, and
   wherein the frictional member has a first area including an area that contacts the vibrator and a second area including an area that is retained by the retaining member, the second area is arranged at both ends of the frictional member in a direction of the relative movement, and the first area is arranged between the second areas at the ends of the frictional member,
   a position at which the frictional member is fixed by the fixing unit is aligned with the first area in the direction of the relative movement, and
   a size of the first area in an orthogonal direction that is orthogonal to both the direction of the relative movement and a pressure direction of the pressurization unit is smaller than a size of the second area in the orthogonal direction.

10. The driver apparatus according to claim 9, wherein the driven member is a part of an imaging optical system.

11. The driver apparatus according to claim 10, wherein the driven member is a lens of the imaging optical system.

12. The driver apparatus according to claim 9, wherein the driven member is an imaging element.

13. The driver apparatus according to claim 9, wherein the driven member is a stage.

* * * * *